Patented Dec. 20, 1938

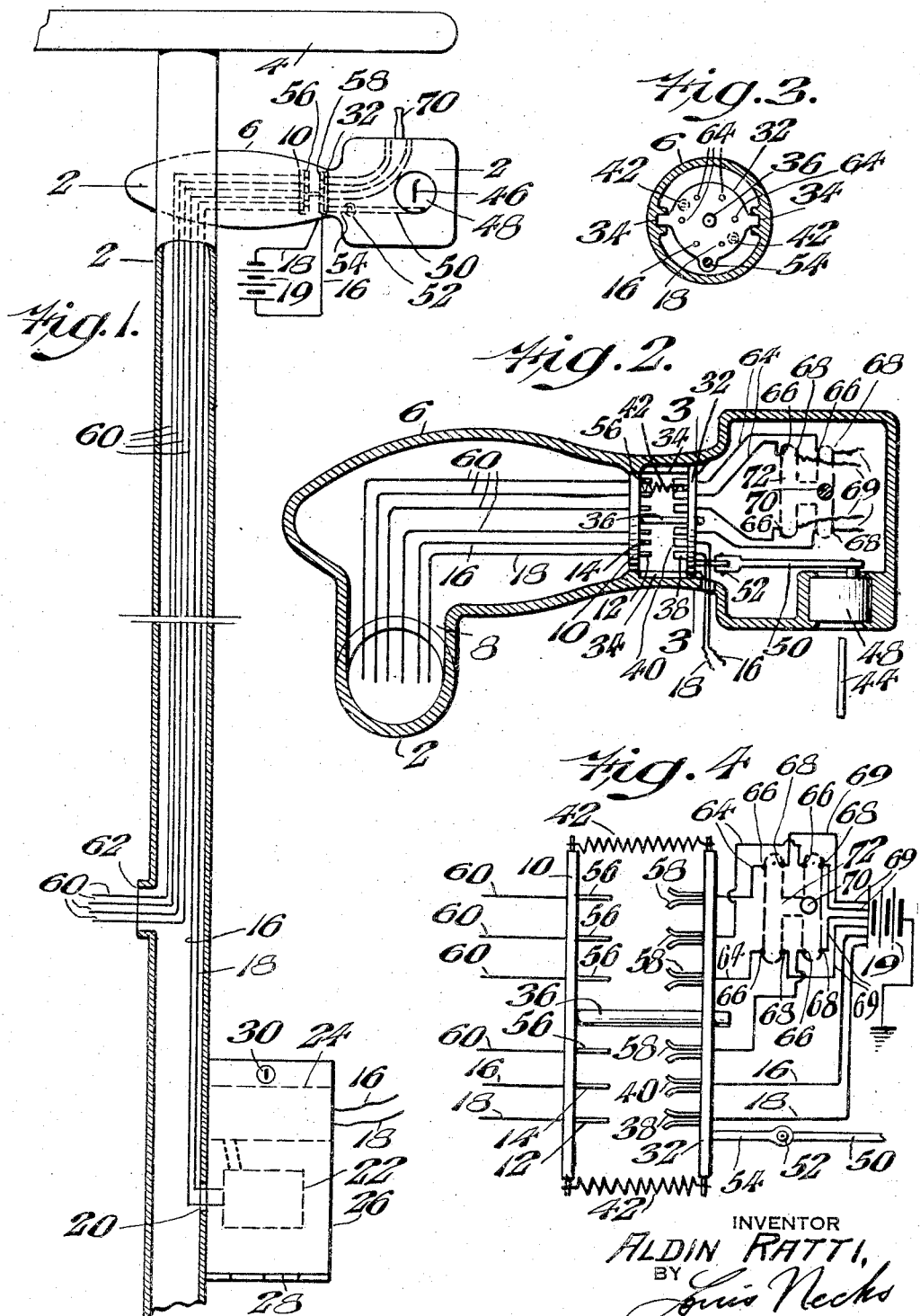

2,140,812

UNITED STATES PATENT OFFICE 2,140,812

COMBINED IGNITION AND GEAR SHIFT LOCKING DEVICE

Aldin Ratti, Ann Arbor, Mich.

Application September 18, 1937, Serial No. 164,457

2 Claims. (Cl. 123—146.5)

My invention relates to a new and useful combined ignition and gear shift locking device whereby either the ignition circuit alone or in conjunction with the electric circuits controlling electric gear shift mechanisms with which vehicles may be equipped can be locked against unauthorized use by a single locking mechanism, and whereby the ignition circuit wires as well as the electric gear shifting circuit wires are completely encased and rendered positively inaccessible, preventing tampering therewith and thus further guarding against theft in addition to and independently of the function of the switch locking mechanism.

In order to guard against unauthorized operation of vehicles provision has been made for locking the switch at the terminus of the ignition circuit so that it is necessary to have the proper key to release the switch or to complete the circuit. This device, as shown by the great and constantly increasing number of automobile thefts, is insufficient for the reason that the ignition wires which are easily accessible are spliced to complete the ignition circuit independently of the controlling switch thus permitting the operation of the engine. In order to overcome this disadvantage it has been proposed to sheath the ignition wires in a hard casing from where they leave the switch until they enter under the hood or bonnet of the engine and then to lock the hood simultaneously with or independently of the locking of the ignition switch, but all such proposals have been disadvantageous in one respect or another and none of them has been adopted.

It is therefore an object of my invention to produce a novel construction in which the ignition circuit of a vehicle is not only protected by switch locking means, but also one in which the wires themselves are rendered positively inaccessible for tampering throughout their extent from the switch until they are about ready to connect with the spark plugs of the engine.

It is a further object of my invention to accomplish this result by an extremely simplified and inexpensive construction and one which combines the safety of a switch lock together with the shielding of the wires of the ignition circuit.

Certain automobiles now on the market, such as the "Hudson" and "Terraplane", are provided with an electric gear shifting mechanism known to the trade as an "electric hand" and consisting of four circuits, one for "reverse", one for "low", one for "second" and one for "high" speed, together with a selective switch calculated to energize one or another of the circuits as desired. In this construction the ignition and gear shifting circuits are assembled separately and, as now on the market, only the ignition circuit is provided with a lock switch.

It is therefore another object of my invention to produce a device whereby the ignition and gear shifting circuits are assembled and locked by a single mechanism and as a unit, but whereby only the ignition circuit is completed when the locking device is actuated while the gear shifting circuits are at the same time placed in position to be selectively completed at will.

With the above and other objects in view my invention consists in running the ignition circuit wires as well as the gear shift circuit wires through the steering column and securing to the steering column a solid housing in which the terminals of all of said circuits are located together with means for locking said terminals in or out of contacting position.

My invention consists in further protecting the ignition wires against tampering by passing said wires from the steering column into a securely locked transformer compartment without allowing said wires to emerge or be accessible until said wires are ready to connect with the spark plugs of the engine.

My invention still further relates to other novel features of construction and advantages all as will be seen from the annexed specification and the accompanying drawing in which;

Fig. 1 represents a fragmentary and diagrammatic view partly in section and partly in elevation of a device embodying my invention shown applied to the steering column of a vehicle.

Fig. 2 represents, on an enlarged scale, a section on line 2—2 of Fig. 1.

Fig. 3 represents a section on line 3—3 of Fig. 2.

Fig. 4 is a diagrammatic view showing certain details of the switch construction.

Referring to the drawing in which like reference characters indicate like parts 2 designates the steering column of a vehicle which is provided with the operating wheel 4 and through which extends a rod (not shown) which, when turned by the wheel 4, actuates the steering gear proper (also not shown). At a suitable point on the steering column 2 and mounted in easily accessible fashion, is the hollow housing 6 suitably secured to the steering column and communicating with the hollow interior thereof at 8. Within the housing 6 is mounted the fixed contact plate 10 which is provided with the contact pins 12 and 14. Leading from the contact pins 12 and 14 are the ignition wires 16 and 18 which are adapted to be energized by the battery 19. The wires 16 and 18 enter the steering column at 8 and emerge through a suitable opening 20 near the lower end of the steering column 2 to enter the fuse box 22 from which the wires 16 and 18 enter the transformer 24. The fuse box 22 and induction coil 24 are inaccessibly enclosed in a box 26 which has a hinged cover 28 and a suitable lock 30. From the box 26 the wires 16 and 18 enter the distributer (not shown) and proceed from the distributer to the spark plugs (also not shown). Within the housing 6 I also mount a movable contact plate 32 which slides on suitable guides 34 and 36. The movable contact plate 32 is provided with spring prongs 38 and 40 which are adapted to engage the contact pins 12 and 14 respectively. If desired, spacing springs 42 may be used intermediate the fixed plate 10 and the movable plate 32. As will be seen from Figs. 1, 2 and 4, as long as the contact plates 10 and 32 are spaced apart as shown, so that the pins 12 and 14 are not in contact with the spring prongs 38 and 40, the ignition circuit is broken and it is impossible to start the vehicle. In order to complete the circuit the key 44 is inserted in the key slot 46 to turn the cylinder or tumbler 48, to which is eccentrically secured the rod 50 pivoted at 52 to the pin 54 which in turn is secured to the contact plate 32. When the cylinder 48 is turned, the plate 32 is moved towards the plate 10 and the contact pins 12 and 14 engage the spring prongs 38 and 40. This completes the ignition circuit and the engine can be started. It will thus be seen that the ignition wires are exposed only before they enter the housing 6 and after they have emerged from the induction coil 24, thus effectively preventing unauthorized operation of the engine by "splicing" the wires.

In the case of vehicles provided with electric gear shift mechanisms such as the "electric hand" now standard equipment on "Hudson" and "Terraplane" automobiles, the contact plates 10 and 32 are provided with additional contact pins 56 and prongs 58, one set of contact pin and prong corresponding to each speed, and, in the present instance, four sets are shown—one representing "reverse", one "high", one "second" and one "low". From the contact pins 56 wires 60 also enter the steering column at 8 and emerge therefrom through the opening 62 to go to the gear shift mechanism (not shown). From the prongs 58 other wires 64 lead to contact points 66. Juxtaposed with the contact points 66 are contact points 68 the wires 69 from which lead to the battery 19. It will be seen from the structure thus far described that, even if the key 44 is turned to bring the plates 10 and 32 together and establish contact between the pins 12 and 14 and the corresponding prongs 38 and 40 and between the pins 56 and their corresponding prongs 58, only the ignition circuit through the wires 16 and 18 will be complete and the circuits controlling the electric gear shift mechanism will remain broken. In order selectively to complete any desired one of the four circuits for operating the electric gear shift mechanism, the movable contact 70, which, in Fig. 4, is shown in neutral position, is moved along the H-shaped slot 72, and inserted between any pair of contacts 66 and 68 to energize the corresponding circuit 60. Thus, if the movable contact pin 70 is pushed to the right hand top corner of the H-shaped slot (as viewed in Fig. 4) the circuit is completed with respect to the uppermost wire 60 (also as viewed in Fig. 4) and the gears of the vehicle are then shifted by the electrical mechanism (not shown) to "second gear". If the contact point 70 is moved to the diagonally opposite corner, the circuit represented by the third wire 60 from the top of Fig. 4 is completed, and the gears of the vehicle are shifted to "low gear", and so forth. The H-shaped slot shown in Fig. 4 is of the type now used on "Terraplane" and "Hudson" automobiles, but other types of selective switches for energizing any one of the four circuits may be used.

It will thus be seen that when the ignition is "locked" by the turning of the key 44 the plates 10 and 32 are separated and the circuit through the ignition wires 16 and 18, as well as the circuits through the wires 60 which control the electric gear shift mechanism, are broken. When the key is turned in the opposite direction to complete the circuit through the ignition wires 16 and 18, the electric gear shift circuits running through the wire 60 are not completed, but are in a position to be selectively completed by the manipulation of the main contact point 70.

In actual construction the lock mechanism can be made such that it will be impossible to remove the key as long as the contact pins 12, 14 and 56 are in engagement with the corresponding prongs 38, 40 and 58.

Having thus described my invention what I claim as new and desire to secure by Letters Patent is:

1. In a device of the character stated, a housing secured to and internally communicating with the interior of the hollow steering column of a vehicle, a switch within said housing, means for opening and closing said switch, means for supplying electrical energy to one terminal of said switch, ignition circuit wires connected to the other terminal of said switch and passing from said housing into and extending downwardly through, said steering column, a normally locked compartment mounted near the lower portion of said steering column and communicating with the interior thereof, an induction coil positioned in said compartment and to which said ignition circuit wires are connected, and wires emerging from said compartment and connecting said coil to the engine of said vehicle, whereby the ignition circuit wires are rendered completely inaccessible from the terminal of the energizing switch until after they have been connected to and have emerged from the induction coil.

2. In a device of the character stated, a housing secured to and internally communicating with the interior of the hollow steering column of a vehicle, a switch within said housing, means for opening and closing said switch, means for supplying electrical energy to one terminal of said switch, ignition circuit wires connected to the other terminal of said switch and passing from said housing into, and extending downwardly through, said steering column, a normally locked compartment mounted near the lower portion of said steering column and communicating with the interior thereof, a fuse box and an induction coil positioned in said compartment, said ignition circuit wires being connected through said fuse box to said induction coil, and wires emerging from said compartment and leading from said coil to the engine of said vehicle, whereby the ignition circuit wires are rendered completely inaccessible from the terminal of the energizing switch until after they have been connected to and have emerged from the induction coil.

ALDIN RATTI.